US010851274B2

(12) United States Patent
Delalandre et al.

(10) Patent No.: US 10,851,274 B2
(45) Date of Patent: Dec. 1, 2020

(54) COOLANT MIXTURES FOR USE IN HEAT-EXCHANGE DEVICES IN THE AEROSPACE FIELD

(71) Applicants: Safran Electrical & Power, Blagnac (FR); CENTRE NATIONAL DE LA RECHERCHE SCIENTIFIQUE (CNRS), Paris (FR); INSTITUT NATIONAL POLYTECHNIQUE DE TOULOUSE, Toulouse (FR); ECOLE NATIONALE SUPERIEURE DE CHIMIE DE LILLE, Villeneuve d'Ascq (FR)

(72) Inventors: Nicolas Delalandre, Blagnac (FR); Benjamin Roland Stanislas Joossen, Tatinghem (FR); Jean-Marie Aubry, Oignies (FR); Vincent Gerbaud, Merville (FR); Ivonne Rodriguez-Donis, Toulouse (FR)

(73) Assignees: Safran Electrical & Power, Blagnac (FR); CENTRE NATIONAL DE LA RECHERCHE SCIENTIFIQUE (CNRS), Paris (FR); INSTITUT NATIONAL POLYTECHNIQUE DE TOULOUSE, Toulouse (FR); ECOLE NATIONALE SUPERIEURE DE CHIMIE DE LILLE, Villeneuve d'Ascq (FR); UNIVERSITE DES SCIENCES ET TECHNOLOGIES DE LILLE, Villeneuve d'Ascq (FR)

(*) Notice: Subject to any disclaimer, the term of this patent is extended or adjusted under 35 U.S.C. 154(b) by 0 days.

(21) Appl. No.: 16/310,253

(22) PCT Filed: Jun. 15, 2017

(86) PCT No.: PCT/FR2017/051562
§ 371 (c)(1),
(2) Date: Dec. 14, 2018

(87) PCT Pub. No.: WO2017/216493
PCT Pub. Date: Dec. 21, 2017

(65) Prior Publication Data
US 2019/0256754 A1     Aug. 22, 2019

(30) Foreign Application Priority Data
Jun. 16, 2016   (FR) .................................. 16 55576

(51) Int. Cl.
*C09K 5/04* (2006.01)
(52) U.S. Cl.
CPC ..................................... *C09K 5/04* (2013.01)
(58) Field of Classification Search
None
See application file for complete search history.

(56) References Cited

U.S. PATENT DOCUMENTS

| 3,935,115 A | 1/1976 | Paul |
| 2005/0258026 A1 | 11/2005 | Bassler et al. |
| 2010/0129618 A1 | 5/2010 | Suwa |

FOREIGN PATENT DOCUMENTS

| FR | 2 246 728 A1 | 5/1975 |
| FR | 2 333 120 A1 | 6/1977 |
| GB | 1523989 | * 9/1978 |

OTHER PUBLICATIONS

Fredenslund, A. et al; "Computerized Design of Multicomponent Distillation Columns Using the UNIFAC Group Contribution Method for Calculation of Activity Coefficients", Ind. Eng. Chem. Process Des. Dev, vol. 16 No. 4, 1977, pp. 450-462.

(Continued)

*Primary Examiner* — John R Hardee

(74) *Attorney, Agent, or Firm* — Oblon, McClelland, Maier & Neustadt, L.L.P.

(57) ABSTRACT

A coolant mixture including water and at least one of the compounds chosen from 1-methoxy-2-propanol and 1-ethoxy-2-propanol in the proportions of the corresponding azeotrope or in near-azeotropic proportions. Such a mixture can be used as a heat-transfer fluid in a heat-exchange device, which can be incorporated into an aircraft or spacecraft. A method for obtaining a mixture by fractional distillation is also disclosed.

18 Claims, 2 Drawing Sheets

(56) References Cited

OTHER PUBLICATIONS

International Search Report dated Aug. 31, 2017 in PCT/FR2017/051562, 3 pages.

Khoshsima, A. et al. "Vapor-liquid and liquid-liquid equilibrium calculations in mixtures containing non-ionic glycol ether surfactant using PHSC equation of state" Fluid Phase Equilibria, Elsevier, vol. 377, XP029013229, 2014, pp. 16-26.

Tochigi, K. et al. "Isobaric vapor-liquid equilibria for water+propylene glycol monomethyl ether (PGME), water+propyleneglycol monomethyl ether acetate (PGMEA),and PGME+PGMEA at reduced pressures" Fluid Phase Equilibria, Elsevier, ScienceDirect, vol. 260, No. 1, XP022219037, 2007, pp. 65-69.

\* cited by examiner

COOLANT MIXTURES FOR USE IN HEAT-EXCHANGE DEVICES IN THE AEROSPACE FIELD

The present invention relates to the field of heat-transfer fluids for heat exchange systems, especially two-phase fluid loops, in particular when they are used for cooling the power electronics in aerospace.

The densification of so-called power electronic equipment on board aircraft increases the exigences relative to performance of cooling systems. Use of two-phase loops with capillary or mechanical pumping can constitute a pertinent solution, on condition that the heat-transfer fluid on which such heat exchangers are based satisfies restrictions inherent to the aerospace field. In fact, the operating principle of a two-phase cooling system is based on evaporation and condensation of a so-called heat-transfer fluid, in that it allows thermal exchanges. Also, the performance of the two-phase loop and its adequacy for a given environment depend largely on the properties of the fluid.

As of now, fluids currently employed in cooling loops on board planes are ammonia, methanol, acetone and ethanol. But their use proves particularly dangerous, to the extent where ammonia is toxic (its $LD_{50}$ is just 350 mg/kg), whereas the three others are highly flammable (flash points, noted FP, of methanol, acetone and ethanol are respectively 11° C., −20° C. and 13° C.).

Apart from requirements in terms of safety, particularly crucial on board aircraft, the heat-transfer fluid must exhibit characteristics which guarantee good performances as coolant liquid. Therefore, high vaporisation enthalpies ($\Delta H_{vap}$ hereinbelow), heat capacity and thermal conductivity favour heat exchanges.

Water could appear as being the ideal candidate. It is accordingly a non-toxic, fireproof compound that has a very high vaporisation enthalpy, above 2000 kJ/kg, as many characteristics as a good heat-transfer fluid has to comprise. But its melting temperature ($T_m$ hereinbelow) is far too high to allow its use in a cooling system forming an integral part of an aircraft. In fact, water freezes at 0° C., whereas fluid must exist in the liquid state at much lower temperatures for applications in an aerospatial environment to be possible. It therefore matters that the heat-transfer fluid has a low enough melting temperature (typically $T_m$ less than −55° C.), and has a boiling temperature (noted $T_b$) compatible with preferred conditions of use. It is especially necessary that the fluid has good volatility, which manifests by a boiling temperature moderated to the pressure of use. Given this, carbon dioxide is too volatile however, to the extent where its boiling temperature is so low that it exists only in the gaseous state in the usual pressure conditions.

Finally, the number of criteria to be verified by a heat-transfer fluid employed in the aerospace field is such that there is no known pure compound which is fully satisfactory. As a consequence, recourse is made to mixtures so as to eliminate the insufficiencies of pure fluid relative to one or more specifications.

Examples of commercial coolant mixtures are the JEFFCOOL® range by Huntsman, and more particularly the E100, E100N or P200 products which consist of ethylene glycol, a highly toxic compound, or propylene glycol diluted in water. These products bring the possibility of lowering the melting temperature of water when mixed with adequate compound, which acts as antigel. But no application of these coolant fluids has been possible in an aeronautical context, which can be explained both by their excessive boiling temperature ($T_b$ above 100° C.), and also by a major disadvantage linked to the very nature of the mixtures. In fact, when a mixture evaporates, the vapor and liquid phases in equilibrium generally have different compositions, which can lead to partial vaporisation or condensation phenomena inside a two-phase loop, resulting in degradation of thermal performances of the heat exchanger.

This problem can be avoided by preferring the use of azeotropic mixtures, which has already been proposed in the literature. By definition, an azeotrope is a mixture of two compounds or more, which behaves as a pure substance; as for the so-called azeotropic composition, the vapor and liquid phases have the same composition. It should be noted that in these conditions, the relative volatilities of the azeotropic constituents taken two by two are equal to a unit. This brings a liquid-vapor state change causes no modification of the composition of the vapor phase. Therefore, binary or ternary azeotropic mixtures are sold as coolant fluid by the companies 3M, Arkema, Dupont and Solvay. These mixtures comprise one or more hydrofluoroethers (HFE) which have the advantage of being fireproof and respectful of the environment, since in particular they cause no deterioration of the ozone layer. But these commercial products have vaporisation enthalpy below 250 kJ/kg, which is too low for them to be considered as effective from the viewpoint of thermal exchanges.

The aim of the present invention is therefore to propose novel coolant fluids which constituent no danger for humans or the environment, which can be used in a restrictive context such as aerospace especially having strict demands relative to safety, and ensure the efficacy of the heat exchanger inside which they are incorporated.

These different specifications can be expressed in the form of criteria to be verified by some characteristic parameters of the fluid:

With respect to impact on health and environment, it matters that the fluid is non-toxic.

To guarantee safety for use in an aircraft for example, it is imperative that the fluid is minimally flammable (category 3 according to European classification), corresponding to a flash point FP such as 23° C.≤FP<60° C., or fireproof (category 4), that is having a FP greater than or equal to 60° C.

In the aerospace field, it is indispensable for the melting temperature of the fluid to be under −55° C.

The fluid can be considered as having good volatility if its boiling temperature is below 100° C.

As for thermal performances, the fluid must be able to store a considerable quantity of heat, revealed by vaporisation enthalpy of over 500 kJ/kg.

These criteria are listed in table 1, also specifying the characteristics of coolant fluids currently used in the aerospace field (acetone, ethanol, methanol, ammoniac, carbon dioxide, and water), as well as those of constituents of commercial coolant fluids such as propylene glycol found in some JEFFCOOL® Huntsman products, or ethoxynonafluorobutane, a hydrofluoroether (HFE) sold as 3M™ Novec™ 7100. The values which fail to satisfy the specifications are in bold and italics.

TABLE 1

Characteristics of known coolant fluids

| Criterion | Toxicity | FP (in °C.) | $T_m$ (in °C.) | $T_b$ (in °C.) | $\Delta H_{vap}$ (kJ/kg) |
|---|---|---|---|---|---|
| | No | ≥23 | <−55 | <100 | >500 |
| Acetone | No | −20 | −95 | 57 | 501 |

TABLE 1-continued

Characteristics of known coolant fluids

| Criterion | Toxicity No | FP (in °C.) ≥23 | $T_m$ (in °C.) <−55 | $T_b$ (in °C.) <100 | $\Delta H_{vap}$ (kJ/kg) >500 |
|---|---|---|---|---|---|
| Ethanol | No | 13 | −114 | 78 | 837 |
| Methanol | Yes | 11 | −97 | 64 | 1098 |
| Ammoniac | Yes | 132 | −78 | −33 | 1371 |
| Carbon dioxide | No | None | −78 | −57 | 400 |
| Water | No | None | 0 | 100 | 2255 |
| Propylene-glycol | No | 107 | −60 | 187 | 736 |
| HFE 3M Novec 7100 | No | None | −138 | 76 | 126 |

As already pointed out, no known pure compound satisfies all criteria imposed by the specification to which the invention proposes responding.

However, a mixture comprising water and at least one well-chosen non-toxic antigel can have a melting temperature under 0° C., while profiting from the considerable heat capacity of water, which further acts as flame retardant.

Also, if said coolant mixture is an azeotrope or a near-azeotrope, its behaviour is similar to that of pure fluid, which limits the phenomenon of partial vaporisation of the mixture which would impair the efficacy of the heat exchanger which would incorporate it.

The applicant has solved this technical problem by developing novel azeotropic or near-azeotropic mixtures which verify all criteria previously specified for coolant fluid which is especially suitable for application in the aerospace field.

The present invention therefore thus relates to a coolant mixture comprising water and at least one of the compounds selected from 1-methoxy-2-propanol and 1-ethoxy-2-propanol in corresponding proportions of azeotrope or in near-azeotropic proportions.

The invention also relates to the use of such a mixture as heat-transfer fluid, especially in a heat exchanger for aerospace application.

An additional aspect of the present invention relates to a heat-exchange device comprising a mixture according to the invention as heat-transfer fluid.

In addition, such a device can be integrated into an aircraft or spacecraft, which constitutes another aspect of the invention.

Lastly, a final aspect relates to a process for producing a mixture of the invention by fractional distillation.

Figure 1:
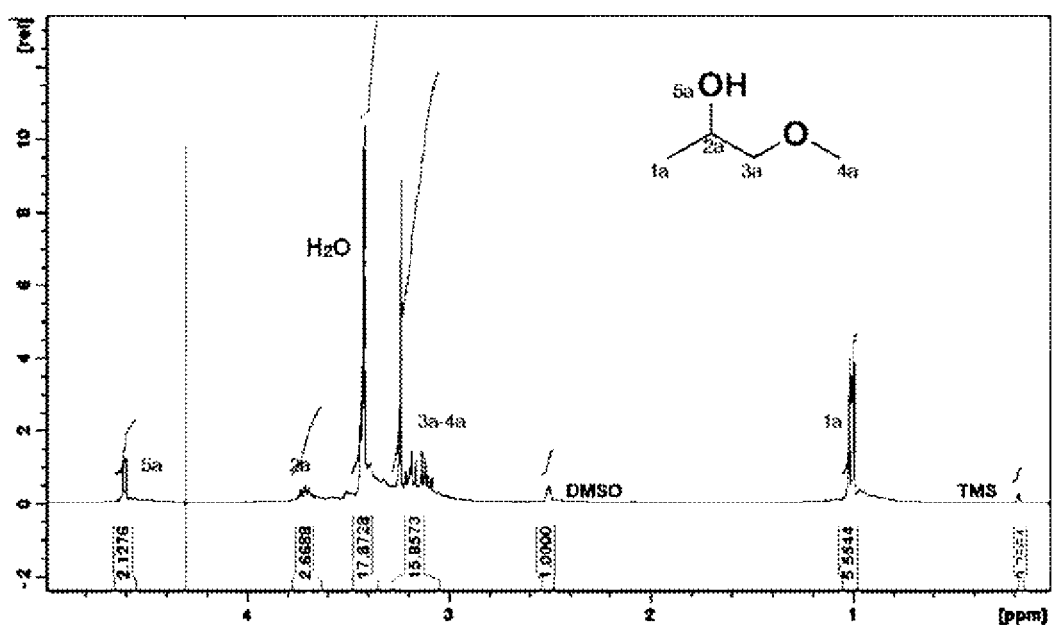
FIG. 1 shows the NMR 1H spectrum of the binary azeotrope constituted by 1-methoxy-2-propanol and water in deuterated DMSO.
Figure 2:
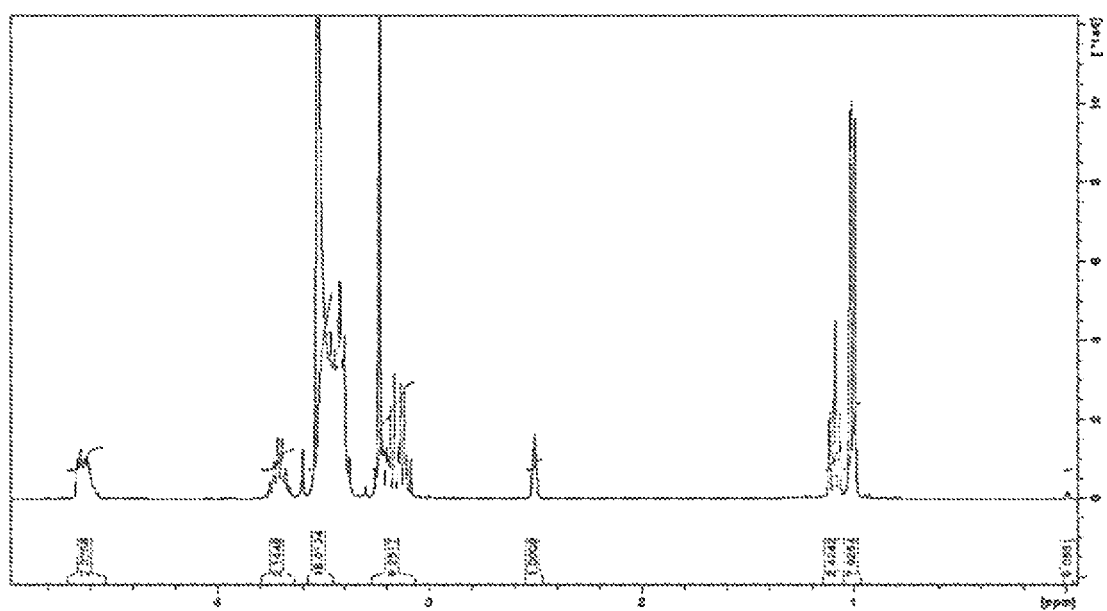
FIG. 2 as such corresponds to the NMR 1H spectrum of the ternary azeotrope constituted by 1-methoxy-2-propanol, 1-ethoxy-2-propanol and water in deuterated DMSO.

The toxicity of a compound can be quantified via its "median lethal dose" or "LD50", which corresponds to the dose of said compound which, when administered orally for example, causes the death of 50% of a given animal population. It is expressed in mg of active substance per kg of animal. In terms of the present invention, a fluid is non-toxic if its oral $LD_{50}$ is greater than 500 mg/kg.

In the context of the present invention "FP" or "flash point" means the minimal temperature expressed in Celsius at which a combustible substance emits vapors sufficiently concentrated to form with ambient air a gaseous mixture which flames on contact with a flame or a hot point, but insufficient for combustion to spread from itself in the absence of the so-called pilot flame. According to regulation (CE) No. 1272/2008 of the European Parliament and of Counsel of Dec. 16, 2008 relating to classification, labelling and packaging of substances and mixtures, a fluid having a FP such as 23° C.≤FP<60° C. belongs to category 3 "minimally flammable", the category 4 "fireproof" corresponding to a FP greater than or equal to 60° C.

The term "antigel" is intended to mean, in the framework of the present invention, a compound which, when mixed with water, lowers the melting temperature of the latter.

For the purpose of the present invention, a "flame retardant" is a substance which serves to reduce the flash point of another compound.

The term "relative volatility" of two constituents i and j, as used in the present invention, refers to the ratio $\alpha_{ij}$ defined according to the following expression:

$$\alpha_{i,j} = \frac{\frac{y_i}{x_i}}{\frac{y_j}{x_j}}$$

wherein $y_i$ and $y_j$ correspond respectively to the molar fractions of the compounds i and j in the vapor phase, and $x_i$ and $x_j$ correspond respectively to the molar fractions of the compounds i and j in the liquid phase.

In the context of the present invention, a "near-azeotrope" is a mixture of two compounds or more which exhibits characteristics close to those of an azeotrope. In particular, within a near-azeotropic mixture the relative volatilities of the constituents of the azeotrope taken two by two are between 0.85 and 1.15.

The present invention primarily relates to a coolant mixture comprising water and one at least of the compounds selected from 1-methoxy-2-propanol and 1-ethoxy-2-propanol in corresponding proportions of the azeotrope or in near-azeotropic proportions.

The coolant mixture preferably comprises water, 1-ethoxy-2-propanol and optionally 1-methoxy-2-propanol in corresponding proportions of the azeotrope or in near-azeotropic proportions.

Table 2 takes up the specification to be respected by the mixtures of the invention and indicates the characteristics of the antigels according to the invention with respect to those of water, which reveals the possible complementarity of water with one and/or the other in antigels which are 1-methoxy-2-propanol and 1-ethoxy-2-propanol within the above mixture.

TABLE 2

Characteristics of water and antigels of the invention

| | | Criterion | | | |
|---|---|---|---|---|---|
| | Toxicity No | FP (in ° C.) ≥23 | $T_m$ (in ° C.) <−55 | $T_b$ (in ° C.) <100 | $\Delta H_{vap}$ (kJ/kg) >500 |
| Water | No | None | 0 | 100 | 2255 |
| 1-methoxy-2-propanol | No | 34 | −97 | 118 | 461 |

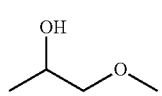

TABLE 2-continued

Characteristics of water and antigels of the invention

| | | Criterion | | | |
|---|---|---|---|---|---|
| | Toxicity No | FP (in ° C.) ≥23 | $T_m$ (in ° C.) <−55 | $T_b$ (in ° C.) <100 | $\Delta H_{vap}$ (kJ/kg) >500 |
| 1-ethoxy-2-propanol | No | 42 | −100 | 132 | 308 |

OH
(structure)

The two binary azeotropes (1-methoxy-2-propanol/water and 1-ethoxy-2-propanol/water), as well as the ternary azeotrope constituted by these three compounds can be prepared by conventional methods well known to those skilled in the art, in particular by fractional distillation from the corresponding mixtures initially rich in water. For a given azeotrope, the mixture obtained after initial distillation is redistilled. The azeotropic temperature, or boiling temperature of the azeotrope is measured as being the temperature of the vapor at the top of the distillation column. The composition of the azeotrope in water can be determined with good precision by the Karl Fisher method, while the proportions of the other constituents can be analysed by differential scanning calorimetry. The azeotrope can be prepared in the proportions determined previously, and fresh more precise distillation can be performed at said azeotropic temperature at given pressure. The composition of the azeotrope prepared in this way is then determined more precisely via analysis by NMR 1H. It should be noted that the precision of this characterization is 1%.

The melting temperature, as well as the vaporisation enthalpy of a given azeotrope are obtained by means of a differential scanning calorimeter.

In respect of FP, it is determined by the TAG ASTM D56 method well known to those skilled in the art.

Another aspect of the invention is therefore the preparation of a mixture according to it by fractional distillation.

In particular, the invention relates to the process for producing a mixture comprising water, 1-ethoxy-2-propanol and optionally 1-methoxy-2-propanol in corresponding proportions of azeotrope or in near-azeotropic proportions by fractional distillation of a mixture comprising water, 1-ethoxy-2-propanol and optionally 1-methoxy-2-propanol.

This is preferably the process for producing the ternary mixture in corresponding proportions of azeotrope or in near-azeotropic proportions by fractional distillation of a mixture comprising water, 1-ethoxy-2-propanol and 1-methoxy-2-propanol.

Complete characterization of the three azeotropes of the invention at atmospheric pressure are specified in table 3.

TABLE 3

Characterisation of the azeotropic mixtures of the invention at atmospheric pressure

| Criterion | FP (in °C.) ≥23 | $T_m$ (in °C.) <−55 | $T_b$ (in °C.) <100 | $\Delta H_{vap}$ (kJ/kg) >500 | Composition (% of the total weight of the mixture) |
|---|---|---|---|---|---|
| Binary azeotrope 1-methoxy-2-propanol/water | 56 | −80 | 97 | 1100 | 1-methoxy-2-propanol: 65% |
| Binary azeotrope 1-ethoxy-2-propanol/water | 48 | −80 | 97 | 1136 | 1-ethoxy-2-propanol: 50% |
| Ternary azeotrope 1-methoxy-2-propanol/water/1-ethoxy-2-propanol | 60 | −80 | 97 | 1195 | 1-methoxy-2-propanol: 41% 1-ethoxy-2-propanol: 28% |

The compositions indicated in table 3 correspond to those of the azeotropic mixtures. Now, the invention also relates to near-azeotropic mixtures, that is, according to it, mixtures for which the relative volatilities of the constituents of the azeotrope taken two by two are between 0.85 and 1.15.

By way of the predictive thermodynamic model UNIFAC ORIGINAL [A. Fredenslund, J. Gmehling, M. L. Michelsen, P. Rasmussen, J. M. Prausnitz, Ind. *Eng. Chem. Process Des Dev.* 16 (1977) 450-462] it has been determined that the mixtures of the invention have near-azeotropic behaviour when the mass percentage of a constituent k, noted $w_k$, belongs to a range of values centred on that of the mass percentage of said constituent within the azeotropic mixture, noted $(w_a)_k$, and is such that $(w_a)_k - 4\% \leq w_k \leq (w_a)_k + 4\%$.

Advantageously, a coolant mixture according to the invention can therefore comprise water and 1-methoxy-2-propanol, 1-methoxy-2-propanol representing between 61 and 69%, preferably between 64 and 66%, and even more preferably 65% of the total weight of the binary mixture at atmospheric pressure.

Another particular mixture of the invention is constituted by water and 1-ethoxy-2-propanol, 1-ethoxy-2-propanol representing between 46 and 54%, preferably between 49 and 51%, and even more preferably 50% of the total weight of the binary mixture at atmospheric pressure.

These two mixtures are minimally flammable (category 3).

Even more advantageously, a fireproof mixture (category 4) according to the invention is constituted by water, 1-methoxy-2-propanol and 1-ethoxy-2-propanol, and comprises between 37 and 45%, preferably between 64 and 66%, and even more preferably 41% by weight of 1-methoxy-2-propanol, between 24 and 32%, preferably between 27 and 29%, and even more preferably 28% by weight of 1-ethoxy-2-propanol and between 27 and 35%, preferably between 30 and 32%, and even more preferably 31% by weight of water relative to the total weight of the ternary mixture at atmospheric pressure.

It is understood that the present invention is not limited to the abovementioned mixtures considered at atmospheric pressure, and that the protection conferred by this title also extends to these mixtures in other pressure conditions. It is also evident for the one skilled in the art that the composition and the boiling temperature of a given azeotropic or near-azeotropic mixture depend on the pressure.

By way of indication, the composition and the boiling temperature of two of the azeotropic mixtures of the invention at a pressure of 0.5 atm feature in table 4 hereinbelow.

TABLE 4

Characterization of two of the azeotropic mixtures of the invention at a pressure of 0.5 atm

| Azeotrope | $T_{eb}$ (n · °C.) | Composition (% of the total weight of the mixture) |
|---|---|---|
| 1-methoxy-2-propanol | 80 | 65 |
| water | | 35 |
| 1-methoxy-2-propanol | 80 | 43 |
| 1-ethoxy-2-propanol | | 26 |
| water | | 31 |

The present invention further relates to the use of a mixture according to it as heat-transfer fluid, advantageously in a heat exchanger, such as a two-phase exchanger.

As is preferred, said use is envisaged for aerospace application.

In particular, said heat exchanger can consist of a two-phase loop with capillary or mechanical pumping.

It can be a two-phase exchanger with capillary pumping, such as heat pipe, CPL, LHP and thermosyphon, well known to those skilled in the art, or a two-phase loop with mechanical pumping.

The invention also relates to a heat-exchange device comprising a mixture according to the invention as heat-transfer fluid.

Said heat-exchange device can especially consist of a two-phase exchanger with capillary pumping or a two-phase loop with mechanical pumping.

Lastly, a final aspect of the invention is an aircraft such as a plane, or a spacecraft such as a satellite, a rocket, probe, capsule, station or space shuttle which integrates a heat-exchange device according to the invention.

The invention claimed is:

1. A coolant mixture, comprising a binary mixture of water and 1-ethoxy-2-propanol in azeotropic or near-azeotropic proportions, wherein the 1-ethoxy-2-propanol represents 46 to 54%, of the total weight of the binary mixture at atmospheric pressure.

2. The coolant mixture according to claim 1, wherein 1-ethoxy-2propanol represents 49 to 51% of the total weight of the binary mixture at atmospheric pressure.

3. The coolant mixture according to claim 1, wherein 1-ethoxy-2-propanol represents 50% of the total weight of the binary mixture at atmospheric pressure.

4. A process for producing a mixture according to claim 1, comprising a fractional distillation of a mixture comprising water and 1-ethoxy-2-propanol.

5. A heat-exchange device comprising a heat-transfer fluid, wherein the heat-transfer fluid is a mixture according to claim 1.

6. The heat-exchange device according to claim 5, wherein the heat-exchange device is a two-phase loop with capillary or mechanical pumping.

7. A method of cooling, comprising producing cold by evaporating a heat-transfer fluid, wherein the heat-transfer fluid is a mixture according to claim 1.

8. The method of cooling according to claim 7, wherein the heat-transfer fluid circulates through a heat exchanger.

9. The method of cooling according to claim 8, wherein the heat exchanger is a capillary-pumped two-phase exchanger or a mechanically-pumped two-phase loop.

10. A coolant mixture, comprising a ternary mixture of water, 1-methoxy-2-propanol and 1-ethoxy-2-propanol in azeotropic or near-azeotropic proportions, wherein the ternary mixture comprises:
37 to 45% by weight of 1-methoxy-2-propanol,
24 to 32% by weight of 1-ethoxy-2-propanol, and
27 to 35% by weight of water relative to a total weight of the ternary mixture at atmospheric pressure.

11. The coolant mixture according to claim 10, comprising:
37 to 45% by weight of 1-methoxy-2-propanol,
27 to 29% by weight of 1-ethoxy-2-propanol, and
30 to 32% by weight of water relative to the total weight of the ternary mixture at atmospheric pressure.

12. The coolant mixture according to claim 10, comprising:
41% by weight of 1-methoxy-2-propanol,
28% by weight of 1-ethoxy-2-propanol, and
31% by weight of water relative to the total weight of the ternary mixture at atmospheric pressure.

13. A process for producing a mixture according to claim 10, comprising a fractional distillation of a mixture comprising water, 1-ethoxy-2-propanol and 1-methoxy-2-propanol.

14. A heat-exchange device comprising a heat-transfer fluid, wherein the heat-transfer fluid is a mixture according to claim 10.

15. The heat-exchange device according to claim 14, wherein the heat-exchange device is a two-phase loop with capillary or mechanical pumping.

16. A method of cooling, comprising producing cold by evaporating a heat-transfer fluid, wherein the heat-transfer fluid is a mixture according to claim 10.

17. The method of cooling according to claim 16, wherein the heat-transfer fluid circulates through a heat exchanger.

18. The method of cooling according to claim 17, wherein the heat exchanger is a capillary-pumped two-phase exchanger or a mechanically-pumped two-phase loop.

* * * * *